United States Patent
Mochizuki et al.

(10) Patent No.: US 11,334,316 B2
(45) Date of Patent: May 17, 2022

(54) INFORMATION PROCESSING APPARATUS AND INFORMATION PROCESSING METHOD

(71) Applicant: SONY CORPORATION, Tokyo (JP)

(72) Inventors: Daisuke Mochizuki, Tokyo (JP); Motosuke Irie, Tokyo (JP)

(73) Assignee: SONY CORPORATION, Tokyo (JP)

(\*) Notice: Subject to any disclaimer, the term of this patent is extended or adjusted under 35 U.S.C. 154(b) by 0 days.

(21) Appl. No.: 17/056,465

(22) PCT Filed: Mar. 1, 2019

(86) PCT No.: PCT/JP2019/008099
§ 371 (c)(1),
(2) Date: Nov. 18, 2020

(87) PCT Pub. No.: WO2019/225109
PCT Pub. Date: Nov. 28, 2019

(65) Prior Publication Data
US 2021/0208843 A1    Jul. 8, 2021

(30) Foreign Application Priority Data

May 23, 2018  (JP) .............................. JP2018-099032

(51) Int. Cl.
*G06F 3/16* (2006.01)

(52) U.S. Cl.
CPC .................................. *G06F 3/167* (2013.01)

(58) Field of Classification Search
CPC ....... G06F 3/167; H04W 12/08; H04W 12/06; G07C 9/22; H04L 63/101; H04L 63/08; G10L 17/24; G10L 17/26; G10L 17/16; G10L 15/22; G10L 2015/223
See application file for complete search history.

(56) References Cited

U.S. PATENT DOCUMENTS

2018/0107445 A1    4/2018 Ohmura
2018/0232589 A1\*  8/2018 Woo ................... G06K 9/00885

FOREIGN PATENT DOCUMENTS

| CN | 107408028 A | 11/2017 |
|---|---|---|
| EP | 3279791 A1 | 2/2018 |
| JP | 2000-322358 A | 11/2000 |
| JP | 2000322358 A \* | 11/2000 |
| JP | 2007-156607 A | 6/2007 |
| JP | 2007156607 A \* | 6/2007 |
| JP | 2009-284095 A | 12/2009 |
| JP | 2016-004375 A | 1/2016 |
| WO | 2010/058683 A1 | 5/2010 |
| WO | 2016/158792 A1 | 10/2016 |

OTHER PUBLICATIONS

International Search Report and Written Opinion of PCT Application No. PCT/JP2019/008099, dated May 21, 2019, 11 pages of ISRWO.

\* cited by examiner

*Primary Examiner* — Fan S Tsang
*Assistant Examiner* — David Siegel
(74) *Attorney, Agent, or Firm* — Chip Law Group (57) ABSTRACT

An information processing apparatus, wherein, in a mode determination unit, an information-providing method in response to an information providing request from a user is determined on the basis of a result of comparing a communication signal or communication signals from one or a plurality of external devices with one or a plurality of registration signals registered in advance.

15 Claims, 8 Drawing Sheets

| SIGNAL TYPE | SIGNAL NAME/APPRATUS NAME |
|---|---|
| Bluetooth | Xperia |
| WiFi | 4CE674WO23HG |
| WiFi | Station FREE WiFi |
| Bluetooth | Wireless Mouse |
| Bluetooth | Smart Watch T03H |
| ⋮ | |

| INFORMATION | WITH OR WITHOUT RESTRICTION | |
|---|---|---|
| EVENT | NO | YES (NUMBER OF EVENTS ONLY) |
| MESSAGE | NO | YES (NUMBER OF EVENTS ONLY) |
| SAVINGS | NO | YES (PRIOR CONFIRMATION) |
| ... | | |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/008099 filed on Mar. 1, 2019, which claims priority benefit of Japanese Patent Application No. JP 2018-099032 filed in the Japan Patent Office on May 23, 2018. Each of the above-referenced applications is hereby incorporated herein by reference in its entirety.

TECHNICAL FIELD

The present technique relates to an information processing apparatus, an information processing method, and an information processing program.

BACKGROUND ART

In recent years, devices called smart speakers, communication robots, etc., which provide various types of information in response to user requests have begun to spread. Such a device can provide various types of information to a user by voice, screen display, and the like.

There has been proposed a system capable of automatically optimizing and displaying objects having various forms for presenting information in a screen display (PTL 1).

CITATION LIST

Patent Literature

[PTL 1] JP 2016-4375A

SUMMARY

Technical Problem

However, in providing information using devices such as smart speakers and communication robots, the information is provided so that anyone who is in a space where such a device is installed can see and hear it, and thus it is necessary to consider privacy and information confidentiality.

The present technique has been made in view of the foregoing, and an object thereof is to provide an information processing apparatus, an information processing method, and an information processing program capable of providing information without the information being known to people other than a specific person.

Solution to Problem

In order to solve the above-described problem, a first technique is an information processing apparatus wherein, in a mode determination unit, an information-providing method in response to an information-providing request from a user is determined on the basis of a result of comparison of a communication signal or communication signals from one or a plurality of external devices with one or a plurality of registration signals registered in advance.

A second technique is an information processing method including determining, by a mode determination unit, on the basis of a result of comparing a communication signal or communication signals from one or a plurality of external devices with one or a plurality of registration signals registered in advance, an information-providing method in response to an information providing request from a user.

A third technique is an information processing program that causes a computer to execute an information processing method including determining, by a mode determination unit, on the basis of a result of comparing a communication signal or communication signals from one or a plurality of external devices with one or a plurality of registration signals registered in advance, an information-providing method in response to an information providing request from a user.

Advantageous Effects of Invention

According to the present technique, it is possible to provide information without the information being known to people other than a specific person. Note that the advantageous effect described here is not necessarily limited, and any advantageous effects described in the description may be enjoyed.

DESCRIPTION OF EMBODIMENTS

Hereinafter, embodiments of the present technique will be described with reference to the drawings. Note that the description will be given in the following order.
<1. Embodiment>
[1-1. Configuration of Information Providing Apparatus]
[1-2. Configuration of Information Processing Apparatus]
[1-3. Signal Registration Processing]
[1-4. Information Providing Control]
<2. Modified Examples>

1. Embodiment

1-1. Configuration of Information Providing Apparatus

Figure 1A:
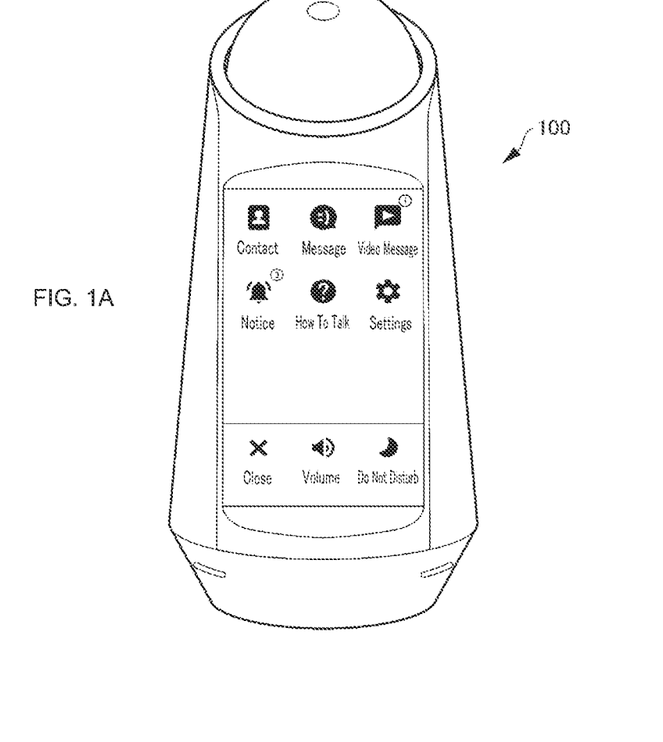
FIGS. 1A and 1B are perspective views illustrating an appearance of an information providing apparatus.
Figure 1B:
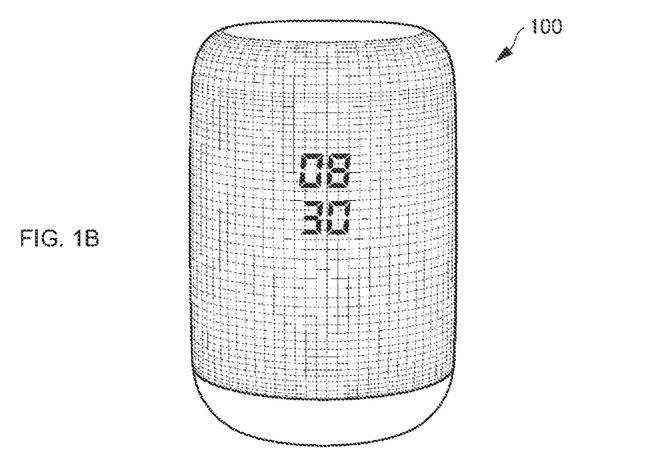
Figure 2:
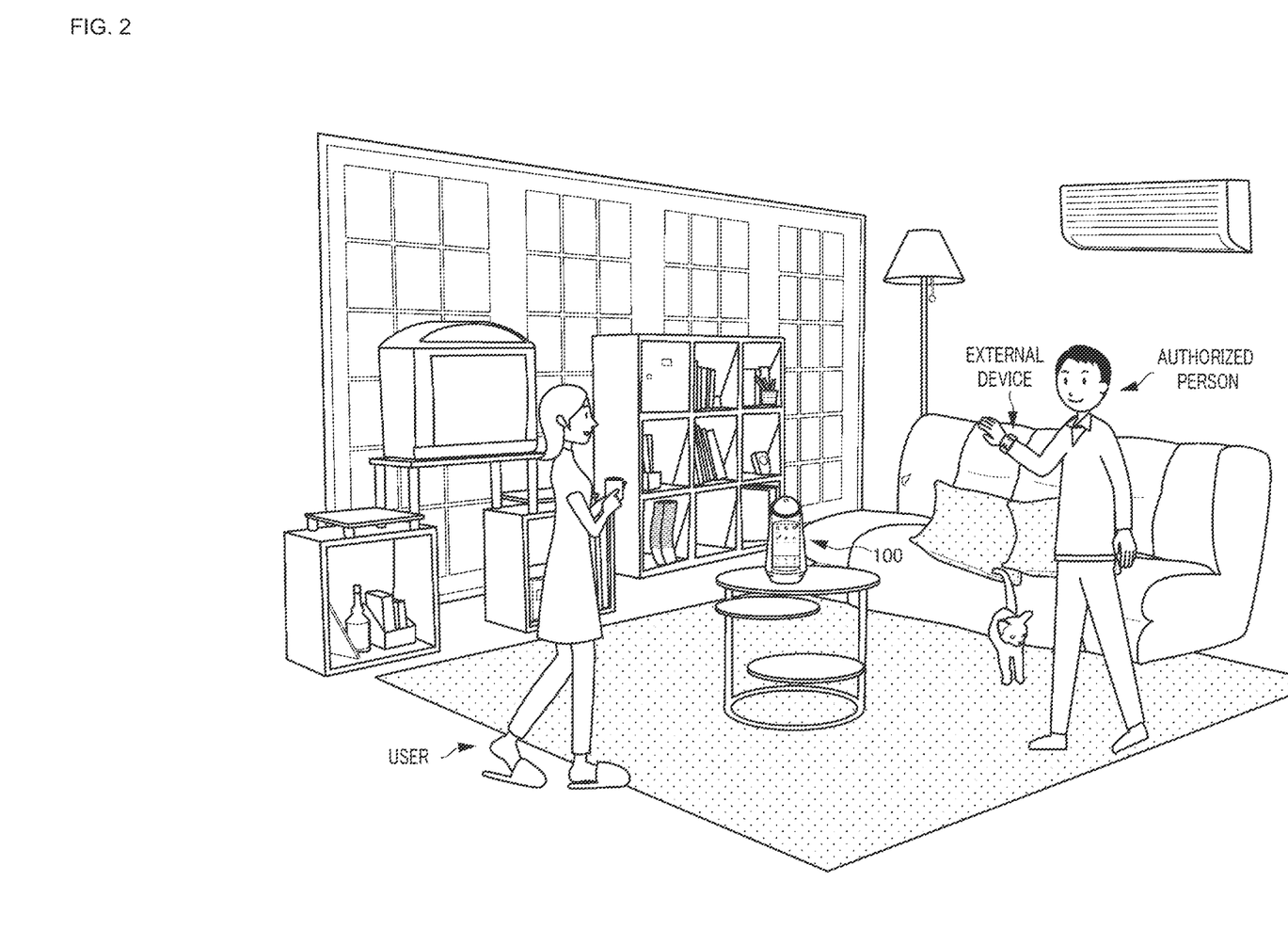
FIG. 2 illustrates an example of a space in which the information providing apparatus is used.

First, a configuration of an information providing apparatus 100 having the functions of an information processing apparatus 200 according to the present technique will be described. The information processing apparatus 200 operates in the information providing apparatus 100. The information providing apparatus 100 is an apparatus that is, for example, a so-called communication robot as illustrated in FIG. 1A, or a so-called smart speaker as illustrated in FIG. 1B, which is capable of providing various types of information to a user in response to a request from the user or voluntarily. In the present embodiment, the information providing apparatus 100 having the functions of the information processing apparatus 200 is intended to be used, for example, in a limited space such as a house of a person who requests the information providing apparatus 100 to provide information (hereinafter referred to as a user), as illustrated in FIG. 2.

The information to be provided by the information providing apparatus 100 to the user includes all information available on the Internet, such as a user's schedule, a message such as an email received by the user, notification of various types of SNSs (Social Network Services), bank account information, weather, traffic information, and store information of restaurants. The information providing apparatus 100 can also play back content such as music.

Figure 3:
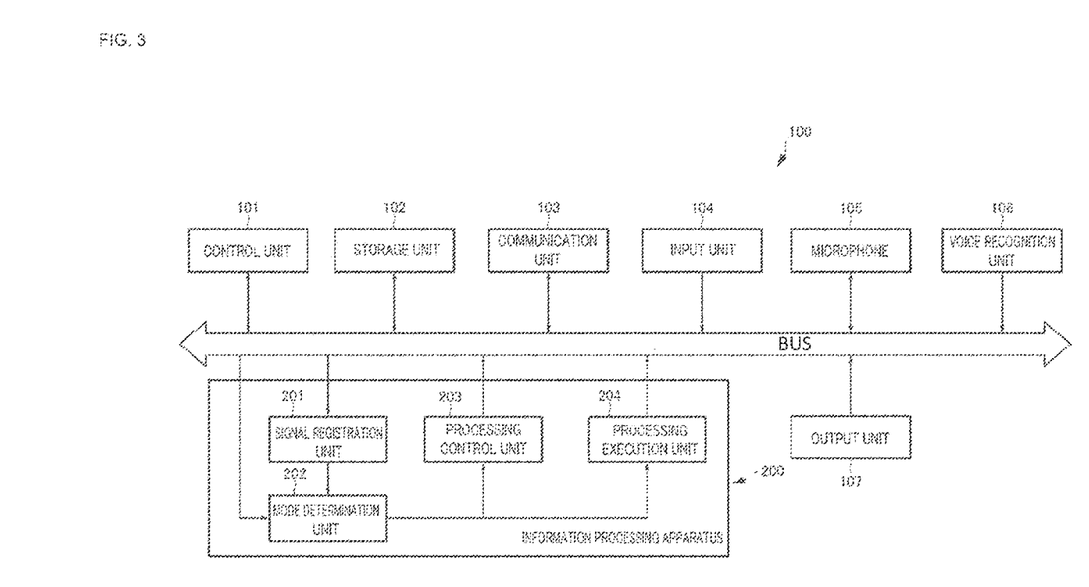
FIG. 3 is a block diagram illustrating a configuration of the information providing apparatus and an information processing apparatus.

As illustrated in FIG. 3, the information providing apparatus 100 includes a control unit 101, a storage unit 102, a communication unit 103, an input unit 104, a microphone 105, a voice recognition unit 106, and an output unit 107.

The control unit 101 includes a CPU (Central Processing Unit), a RAM (Random Access Memory), a ROM (Read Only Memory), and the like. The CPU executes various processing in accordance with the programs stored in the ROM to issue commands, thereby controlling the entire information providing apparatus 100 and the respective units.

The storage unit 102 is, for example, a large-capacity storage medium such as a hard disk or a flash memory. The storage unit 102 stores various types of applications used in the information providing apparatus 100, various types of data input to the information providing apparatus 100 by a user, and the like.

The communication unit 103 serves as a communication module for transmitting and receiving data to and from the Internet, other devices, and the like. Any communication method can be used as long as it can be connected to the Internet and other devices, such as a wireless LAN (Local Area Network), WAN (Wide Area Network), Wi-Fi (Wireless Fidelity), 4G (4th generation mobile communication system), and broadband. Further, the connection with other devices may be performed by any method, for example, wireless LAN such as Wi-Fi, and wireless communication such as Bluetooth (registered trademark) and ZigBee.

The input unit 104 is for a user to input various types of instructions to the information providing apparatus 100. When the user makes an input to the input unit 104, a control signal corresponding to the input is generated and supplied to the control unit 101. In response to this, the control unit 101 executes various types of processing corresponding to the control signal. The input unit 104 may be a touch panel, a touch screen integrated with a monitor, or the like, in addition to or instead of physical buttons.

The microphone 105 records voice around the information providing apparatus 100 and supplies it to the voice recognition unit 106 as an input voice signal. Normally, an information providing request from the user to the information providing apparatus 100, which is a smart speaker, a communication robot, or the like, is made by voice, so that the microphone 105 collects the voice of the information providing request from the user.

The voice recognition unit 106 analyzes the user's voice input from the microphone 105 by means of an existing voice recognition algorithm to acquire the information providing request. The acquired information providing request is supplied to a processing control unit 203 and a processing execution unit 204 of the information processing apparatus 200.

The output unit 107 is an output device for providing information to the user. Examples of the output unit 107 include a monitor that displays images, videos, GUIs (Graphical User Interfaces), and the like, a projector that outputs images, videos, GUIs, and the like, a speaker that outputs voice, and an LED (Light Emitting Diode) that indicates information by turning on light.

The information providing apparatus 100 is configured as described above. When receiving the information providing request from the user, the information providing apparatus 100 searches the storage unit 102 for information held by itself, searches the Internet, and the like, and when acquiring information matching the information providing request, the information providing apparatus 100 performs provision of the information to the user as an output from the output unit 107. When the information providing apparatus 100 cannot acquire the information matching the information providing request from the user, the information providing apparatus 100 notifies the user that information fails to be acquired by means of a message such as "No information" or "Unknown".

1-2. Configuration of Information Processing Apparatus

Next, a configuration of the information processing apparatus 200 will be described. As illustrated in FIG. 3, the information processing apparatus 200 includes a signal registration unit 201, a mode determination unit 202, the processing execution unit 204, and the processing control unit 203.

The signal registration unit 201 registers, among communication signals received by the communication unit 103 included in the information providing apparatus 100, a communication signal serving as a reference for determining in which mode the provision of information to the user is to be performed by the information providing apparatus 100.

Hereinafter, the communication signal registered in the signal registration unit 201 will be referred to as the registration signal.

The mode determination unit 202 compares and determines whether the communication signal supplied from the communication unit 103 is identical to any of the registration signals, and determines, on the basis of the result of the comparison determination, one of normal mode, private mode, and restricted mode in which the provision of information from the information providing apparatus 100 to the user is to be performed. Mode information indicating the determined mode is supplied to the processing control unit 203 and the processing execution unit 204.

The normal mode is a mode for providing the information requested by the user without any restrictions on the provision of information. The private mode is a mode for not providing the information requested by the user at all. The restricted mode is a mode for providing the information requested by the user with a restriction set in advance. Details of each mode will be described below.

In the present technique, as illustrated in FIG. 2, for example, an external device is held by or mounted on a specific person (hereinafter, referred to as an authorized person) who is allowed to know the information requested by the user, such as a family member of the user, in daily life, and transmits a communication signal which is then registered in the signal registration unit 201 as a registration signal. This registration is performed by the user's input or an authorized person's input to the information processing apparatus 200 via the information providing apparatus 100. Note that in this description, devices other than the information providing apparatus 100 and the information processing apparatus 200 are referred to as external devices.

Then, if one or a plurality of communication signals received by the communication unit 103 are each identical to any of the registration signals registered in advance in the signal registration unit 201, the information processing apparatus 200 controls the information providing apparatus 100 so that the information requested from the user is provided to the user in the normal mode, that is, without any restrictions.

This is because if all the communication signals received by the communication unit 103 are the registration signals, it is not necessary to make any restriction on the provision of information even in a case where only the user and the authorized person are in the space where the user and the information providing apparatus 100 are present.

Further, if a communication signal or at least one of a plurality of communication signals received by the communication unit 103 is not identical to any of the registration signals registered in advance in the signal registration unit 201, the information processing apparatus 200 controls the information providing apparatus 100 so that the information requested from the user is not provided to the user, that is, the private mode.

This is because if any one of the communication signals received by the communication unit 103 is not the registration signal, it is regarded that a person (hereinafter referred to as an unauthorized person) other than the person who is allowed to know the information by the user, such as a stranger, in the space where the user and the information providing apparatus 100 are present. The user does not want such an unauthorized person to know the information, and thus it is preferable not to perform the provision of the information.

Furthermore, if a communication signal or at least one of a plurality of communication signals received by the communication unit 103 is not identical to any of the registration signals and a restriction on the provision of information is set in advance, the information processing apparatus 200 controls the information providing apparatus 100 so that the information is provided to the user with a restriction, that is, the restricted mode.

This is because the user requests the information providing apparatus 100 to provide the information, and therefore, it is considered that providing even partial information to the user while making a restriction on the information to keep the details of the information unknown to an unauthorized person is preferable to not providing the information at all due to the unauthorized person being there.

In recent years, terminal devices, such as smartphones, tablet terminals, and wearable devices such as smart watches and glasses-type devices have begun to spread, and many people always carries or wears such terminal devices in daily life. They always transmit some kind of wireless communication signal for communication connection with the Internet and other devices that are linked. The communication signal includes identification information indicating the source terminal device. Therefore, the present technique identifies the terminal device transmitting the communication signal from the identification information included in the communication signal, and utilizes the fact that the communication signal being detected is regarded as the person who owns the terminal device being in the space where the user and the information-providing apparatus 100 is present. Examples of the identification information indicating the transmission source terminal device included in the communication signal include an SSID (Service Set Identifier) for WiFi, and a UUID (Universally Unique Identifier) for Bluetooth (registered trademark).

The processing control unit 203 receives the mode information supplied from the mode determination unit 202, and performs information providing control in the normal mode and the private mode.

The processing execution unit 204 receives the mode information supplied from the mode determination unit 202, and performs information providing control according to the mode. The processing execution unit 204 stores and holds unique restriction information set in advance for each piece of information, and performs the information providing control using the unique restriction information when the mode is the restricted mode.

The information providing apparatus 100 and the information processing apparatus 200 are configured as described above. The information processing apparatus 200 is implemented by a program, and the program may be installed in advance on the information providing apparatus 100, or may be distributed by downloading, a storage medium, or the like, to be installed on the information providing apparatus 100 by the user himself/herself. Further, the information processing apparatus 200 may be implemented not only by a program but also by combining a dedicated device, a circuit, or the like with hardware having the functions.

Further, the information processing apparatus 200 may be configured in a server so as to receive communication signal information from the information providing apparatus 100 via a network so that the server performs control of performing mode determination processing and information providing control, and transmitting control information to the information providing apparatus 100 via the network.

1-3. Signal Registration Processing

Next, processing in the information processing apparatus 200 will be described. First, signal registration processing in the signal registration unit 201 of the information processing apparatus 200 will be described. The signal registration processing is for registering a communication signal, which is a reference for determining the mode for the provision of information, in advance as a registration signal in order to perform the provision of information.

As described above, in the present technique, the fact that the communication signal includes the identification information indicating the external device of transmission source is used to identify the external device transmitting the communication signal in response to receiving the communication signal, and it is regarded that the person who owns the external device is in the space where the user and the information providing apparatus 100 are present. If the communication signal is identical to any of the registration signals, the person who owns the external device transmitting the communication signal is regarded as an authorized person. On the other hand, if the communication signal is not identical to any of the registration signals, the person who owns the external device transmitting the communication signal is regarded as an unauthorized person. If the communication signal indicates only the authorized person, the provision of information is performed in the normal mode, and if the communication signal indicates the unauthorized person, the provision of information is not performed, that is, the private mode, or the provision of information is performed in the restricted mode.

In the signal registration unit 201, the identification information indicating the external device of transmission source included in the communication signal and a reception strength information of the communication signal are registered. Furthermore, registered therein is also discrimination information indicating either that the registration signal corresponds to a communication signal from an external device owned by an authorized person or that the registration signal does not correspond to a communication signal from an external device owned by an authorized person but a communication signal that is constantly present in the space where the information providing apparatus 100 is present. As the reception strength information of the communication signal, either or both of an average value and a variance value may be registered.

The registration of the communication signal can be performed by various methods.

In a first method, first, the information processing apparatus 200 provides to the user an instruction to turn off the power and the communication function of an external device transmitting the communication signal to be registered, via the information providing apparatus 100. This is performed by means of, for example, presenting a message such as "Turn on the power and communication function of the device to be registered." to the user by voice output and/or monitor display on the output unit 107, and then presenting "Turn on the power and communication function of the device to be registered." Then, a communication signal which is a newly received communication signal within a certain period from the instruction and has a reception strength of a predetermined strength or higher is registered as a registration signal. In this method, the user needs to not only turn on the external device successfully within the certain period and but also turn on the communication function to transmit the communication signal.

Figure 4:
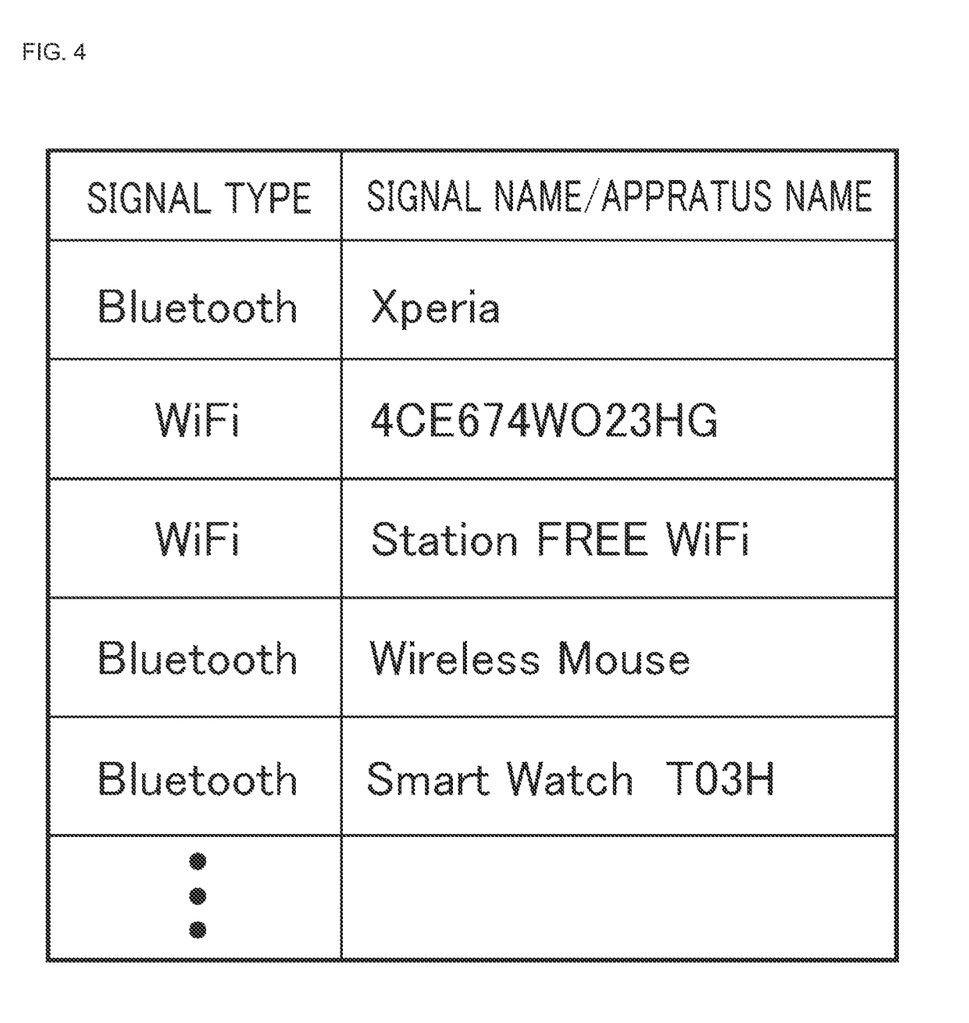
FIG. 4 illustrates an example of a list of signals to be presented to a user in signal registration processing.

In a second method, a list of communication signals received by the communication unit 103 and supplied to the signal registration unit 201 at the time of performing the signal registration processing is presented to the user by means of monitor display on the output unit 107 of the information providing apparatus 100 as illustrated in FIG. 4. Then, a communication signal selected by the user's input to the input unit 104 is registered as a registration signal.

Figure 5A:
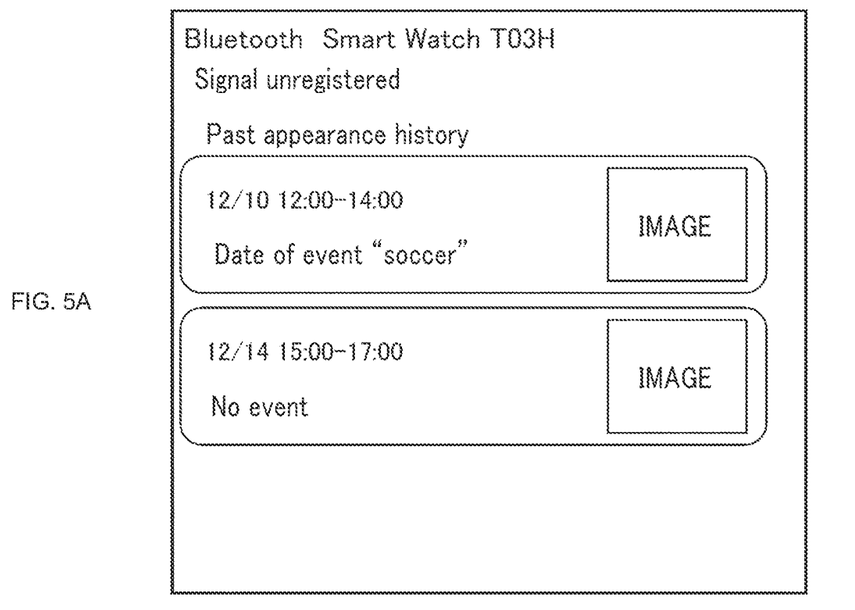
FIGS. 5A and 5B illustrate an example of associated information presented to the user in the signal registration processing.
Figure 5B:
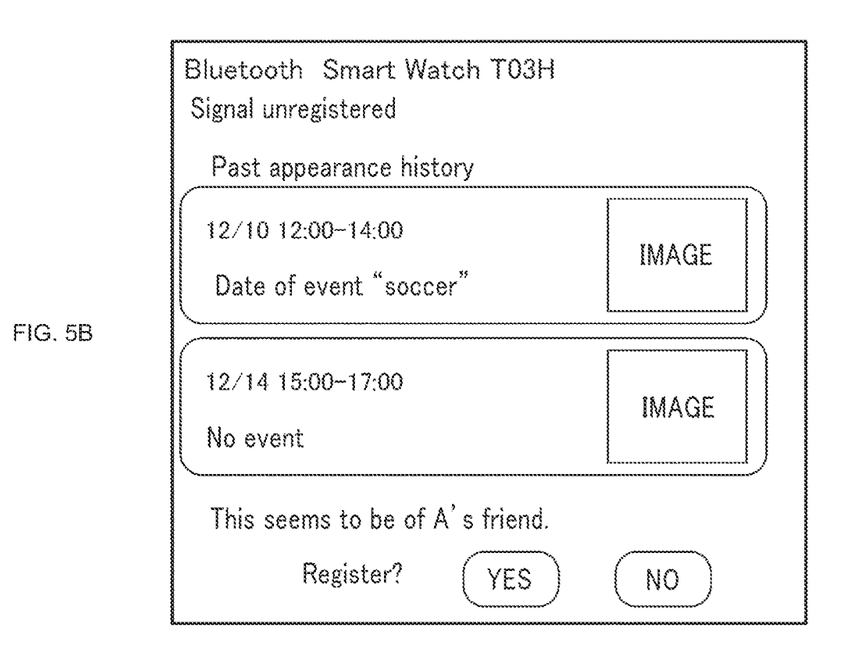

In this second method, associated information may be provided to facilitate the selection by the user as illustrated in FIGS. 5A and 5B. In the example of FIG. 5A, the past appearance history of the communication signal, schedules of the user when the communication signal appears in the past, and images captured when the communication signal appears in the past are presented.

Presenting the past appearance history of the communication signal to the user in this manner makes it possible for the user to estimate whose external device causes the communication signal.

Further, presenting the user's schedule when the communication signal appears in the past to the user makes it possible to help the user estimate the owner of an external device that transmits the communication signal from the schedule. Note that the presentation of the user's schedule can be performed in the case where the information providing apparatus 100 has a calendar function and a function of registering the user's schedule, and the user has registered the schedule in the information providing apparatus 100 in advance. Note that the calendar function is a function that allows the user to enter a schedule by specifying a time zone for each date on the calendar and manage it, and is also a function that is installed in recent smartphones, smart speakers, communication robots, and the like as default.

In addition, presenting the image captured when the communication signal appears in the past to the user makes it possible to help the user estimate the owner of an external device that transmits the communication signal from the image. Note that the presentation of the image requires that the information providing apparatus 100 has a camera function and image capturing has been performed within a predetermined period before and after the timing at which the communication signal appears in the past.

Furthermore, an estimation result may be presented as illustrated in FIG. 5B. The estimation result is an estimation of who is the owner of an external device transmitting the communication signal by machine learning and the like on the basis of the appearance pattern of the communication signal, the relationship of the appearance timing with the already registered registration signal, and the like. Presenting this estimation result to the user makes it possible to help the user estimate who is the owner of the external device that transmits the communication signal.

In the example of FIG. 5B, since the communication signal has the same appearance timing as the registration signal from an external device owned by person A, an estimation result is presented that the communication signal is the communication signal from an external device owned by a friend of person A.

Note that, in order to present this estimation result, it is necessary to register information on the external device transmitting the registration signal and the name of the owner of the external device in association with the registration signal in the signal registration unit 201.

Note that it is not always necessary to provide all the above-mentioned pieces of information, and all the pieces of information may be provided, any one of the pieces of information may be provided, or two or more of the pieces of information may be provided.

Further, it is considered that any communication signals from various devices are always present in the space where the information providing apparatus 100 is present, in addition to the communication signal transmitted by the external device owned by the authorized person. In the signal registration unit 201, a communication signal that is always present in the space where the information providing apparatus 100 is present is registered as a communication signal that is constantly present, as follows.

First, the identification information and the reception strength included in the communication signal received by the communication unit 103 are held as a history at a predetermined time interval (e.g., every other hour). Then, when the history is accumulated for a predetermined period (e.g., three days), the presence or absence of the reception of the communication signal and statistics of changes of the reception strength are calculated for each piece of identification information.

As a result, if the changes of the reception strength are within a certain range and the period during which no communication signal is received is equal to or less than a certain ratio, the communication signal is regarded as a communication signal that is constantly present. This processing is performed periodically (e.g., every other day), and information on communication signals that are constantly present is continuously updated.

It can be said that, among the communication signals registered as the communication signals that are constantly present in this way, there is a high possibility that the communication signal having a frequency of appearance equal to or higher than a predetermined frequency and a fluctuation of reception strength equal to or higher than a predetermined degree is a communication signal transmitted by an external device owned by a person who is constantly present near the user. Therefore, such a communication signal may be presented to prompt the user to register it as a registration signal.

1-4. Information Providing Control

Figure 6:
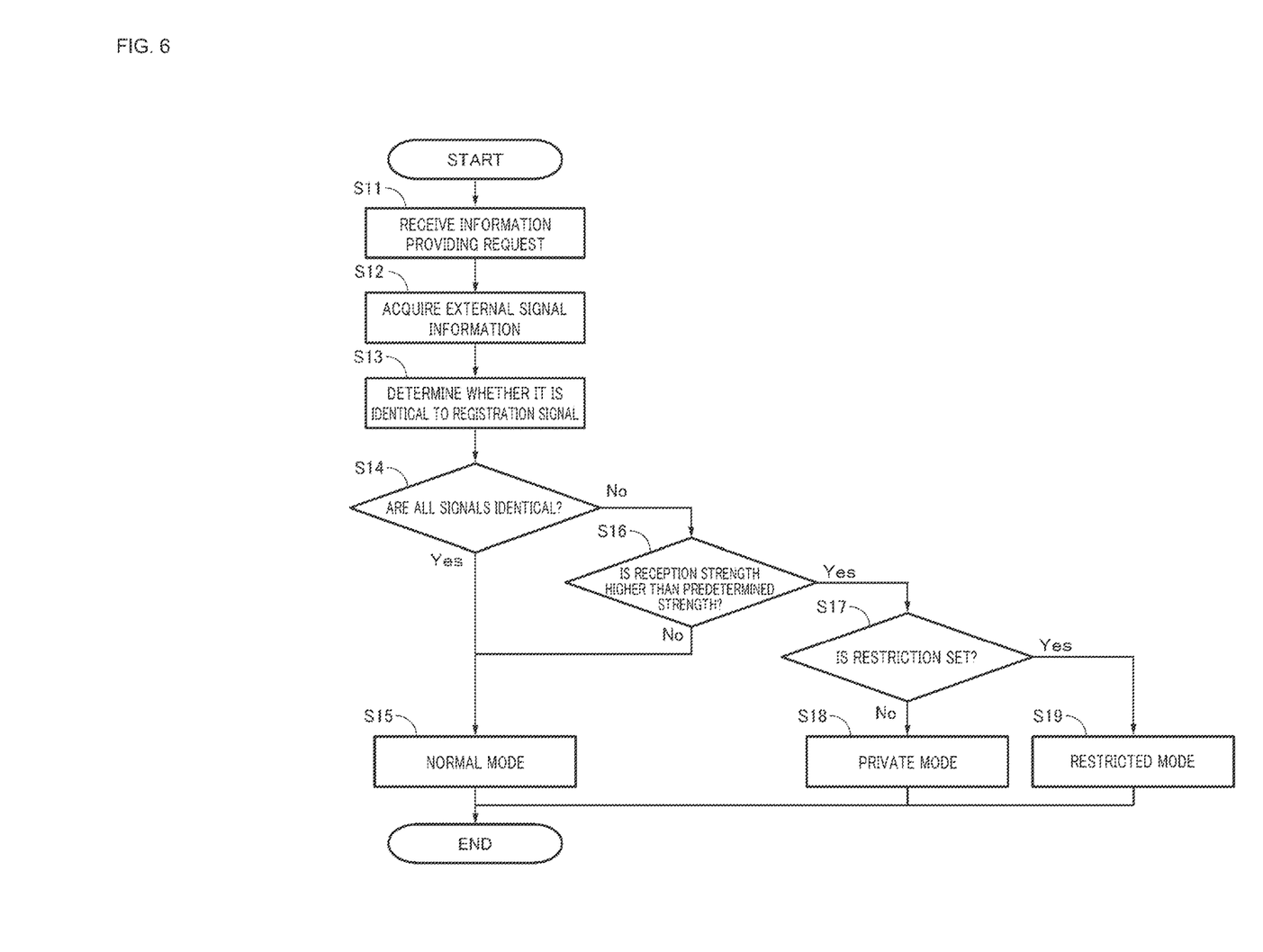
FIG. 6 is a flowchart illustrating a flow of information providing control.

Next, the information providing control by the information processing apparatus 200 will be described with reference to the flowchart of FIG. 6. In the information providing control, the mode determination unit 202 performs the processing until the mode is determined, and the processing control unit 203 or the processing execution unit 204 performs processing of controlling the information providing apparatus 100 to execute the provision of information according to the determined mode.

First, in step S11, an information providing request from the user is received. This information providing request is made, for example, by a voice of the user. The microphone 105 collects the voice of the user, and voice recognition processing is performed on the voice to recognize the information providing request from the user, which is then received. Note that the information providing request from the user may be made by inputting on a physical button, a touch panel, or the like, which serves as the input unit 104, and in that case, the voice recognition processing is not necessary.

The information providing request by the voice of the user is performed by, for example, the user saying a predetermined keyword that triggers voice recognition, such as the name of the information providing apparatus 100 or a secret word, and then saying a word indicating requested information such as "What is today's schedule?", "What is the weather today?", and "Read the message."

Next, in step S12, information on communication signals currently being received is acquired from the communication unit 103.

Next, in step S13, it is determined whether or not all of the received communication signals are identical to the registration signals registered in the signal registration unit 201.

Then, if all the received communication signals are identical to the registration signals, the processing proceeds from step S14 to step S15 (Yes in step S14). Then, in step S15, the information processing apparatus 200 controls the information providing apparatus 100 in the normal mode so as to perform the provision of information to the user.

On the other hand, if all, some, or one of the received communication signals do not match the registration signals, the processing proceeds from step S14 to step S16 (No in step S14). Next, in step S16, it is determined whether or not the reception strength of the communication signal that is not identical to any of the registration signals is equal to or higher than a predetermined strength.

If the reception strength of the communication signal that is not identical to any of the registration signals is not equal to or higher than the predetermined strength, the processing proceeds to step S15 (No in step S16), and the information processing apparatus 200 controls the information providing apparatus 100 in the normal mode so as to perform the provision of information to the user.

On the other hand, if the reception strength of the communication signal that is not the registration signal is equal to or higher than the predetermined strength, the processing proceeds from step S16 to step S17 (Yes in step S16).

Note that, in step S16, the reason why the reception strength of the communication signal that is not the registration signal is compared is because a communication signal that is determined not to be a registration signal may be a communication signal transmitted by an external device outside the space (house or the like) where the information providing apparatus 100 is present, and accordingly it may be regarded that such a communication signal does not need to be considered. Such a communication signal from the outside usually does not have a high reception strength, and thus can be excluded from the communication signals to be registered by comparing it with the predetermined reception strength as a threshold value.

If the communication signal that is not identical to any of the registration signals is such a communication signal from the outside of the space, this means that all the communication signals that are identical to the registration signals are the communication signals from external devices in the space where the information providing apparatus 100 is present, and thus the information processing apparatus 200 controls the information providing apparatus 100 in the normal mode so as to perform the provision of information to the user.

Next, in step S17, it is determined whether or not a restriction is made on the provision of information. This can be performed by confirming whether the restriction information set by the user is held in the processing execution unit 204. If a restriction is not made on the provision of information, the processing proceeds to step S18 (No in step S17), and the information processing apparatus 200 controls the information providing apparatus 100 in the private mode so as not to perform the provision of information to the user.

On the other hand, in step S17, if a restriction is made on the provision of information, the processing proceeds to step S19 (Yes in step S17), and the information processing apparatus 200 controls the information providing apparatus 100 in the restricted mode so as to perform the provision of information to the user.

The information providing control by the information processing apparatus 200 is performed as described above.

Figure 7:
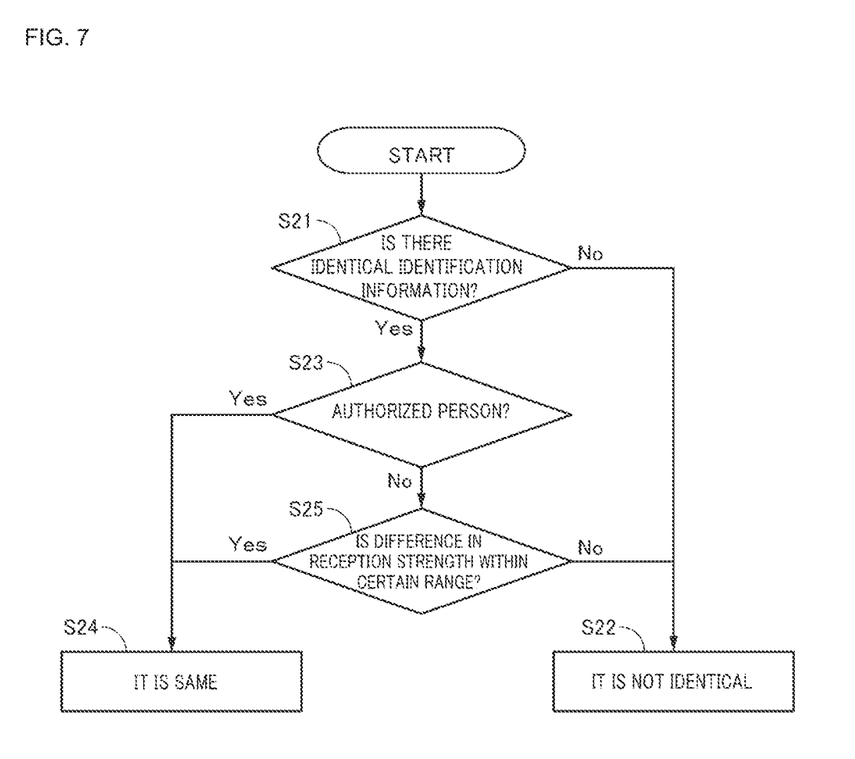
FIG. 7 is a flowchart illustrating a flow of comparison determination processing for a communication signal and a registration signal.

Here, with reference to a flowchart of FIG. 7, comparison determination processing of whether or not the communication signal is identical to any of the registration signals in step S13 of the flowchart of FIG. 6 will be described. This processing is performed by the mode determination unit 202.

First, in step S21, it is determined whether or not a registration signal having the same identification information as the identification information indicating the external device of transmission source included in the communication signal is registered in the signal registration unit 201. If there is no registration signal having the same identification information, the processing proceeds to step S22 (No in step S21), and then it is determined that the communication signal is not identical to any of the registration signals.

On the other hand, if a registration signal having the same identification information as the identification information indicating the external device of transmission source included in the communication signal is registered in the signal registration unit 201 in step S21, the processing proceeds to step S23 (Yes in step S21).

Next, in step S23, it is determined whether or not the communication signal having the same identification information as the identification information included in the registration signal registered in the signal registration unit 201 is registered to be for an authorized person.

If the communication signal having the identification information is registered to be for an authorized person, the processing proceeds to step S24 (Yes in step S23), and then it is determined that the communication signal is identical to the registered signal.

On the other hand, if the communication signal having the identification information is not registered to be for an authorized person, the processing proceeds to step S25 (No in step S23).

Next, in step S25, it is determined whether or not the difference between the reception strengths of the communication signal and the registration signal, which are determined as having the same identification information in step S21, is within a predetermined range. If the difference between the reception strengths is within the predetermined range, the processing proceeds to step S24 (Yes in step S25), and then it is determined that the communication signal is identical to the registration signal. This is because it can be said that the difference between the reception strengths being within the predetermined range means that the reception strengths do not differ greatly and there is a high probability that the signals are communication signals from the same external device.

On the other hand, if the difference between the reception strengths is not within the predetermined range, the processing proceeds to step S22 (No in step S25), and then it is determined that the communication signal is not identical to the registration signal.

As described above, the comparison determination processing for the communication signal and the registration signal is performed.

Next, specific examples of the mode for the provision of information, that is, the normal mode, the private mode, and the restricted mode will be described.

First, the normal mode is a mode for providing the information requested by the user without any restrictions.

For example, if the information requested by the user is "user's schedule", a user's specific schedule is provided such as "You have a meeting scheduled for 10 a.m. today."

Further, for example, if the information requested by the user is "user's received messages", the specific content of a message is provided such as "You have a new message from Mr. A. The message will now be read out."

Furthermore, for example, if the information requested by the user is "user's savings balance", a specific amount of the savings balance is provided such as "Your balance is currently 258,000 yen."

An information-providing method for each of the three examples is performed by means of voice output from a speaker serving as the output unit 107, display on a monitor serving as the output unit 107, or the like.

The private mode is a mode for not providing the information requested by the user. No matter what type of information is requested from the user, the information is not provided, and only a notification that the information is to be not provided, is issued such as "Currently unavailable," "Currently unable to display the information". A method for this notification is performed by means of voice output from a speaker serving as the output unit 107, display on a monitor serving as the output unit 107, or the like. A configuration for issuing this notification corresponds to the notification unit in the claims.

The restricted mode is a mode for providing information according to a unique restriction set for each piece of information in advance.

For example, if the information requested by the user is "user's schedule", the unique restriction is to provide only the number of events. When the user requests to provide today's schedule, only the number of events is provided, such as "You have 2 events scheduled for today", but the specific content of the schedule is not provided.

For example, if the information requested by the user is "user's received messages", the unique restriction is to provide only the number of messages. When the user requests to provide a new received message, only the number of messages is provided, such as "You have 3 new messages from Mr. A." or "You have 4 new messages", but the specific contents of the messages are provided.

Furthermore, the unique restriction is, for example, if the information requested by the user is "user's savings balance", to output a confirmation message (notification) of whether or not the provision of the information is allowed before the provision of the information. When the user requests to provide the savings balance, a confirmation message is output such as "Are you sure you want to present the balance?", but the specific details of the savings balance are not provided. A configuration for issuing this confirmation notification of whether or not the provision of the information is allowed corresponds to the notification unit in the claims.

Figure 8:
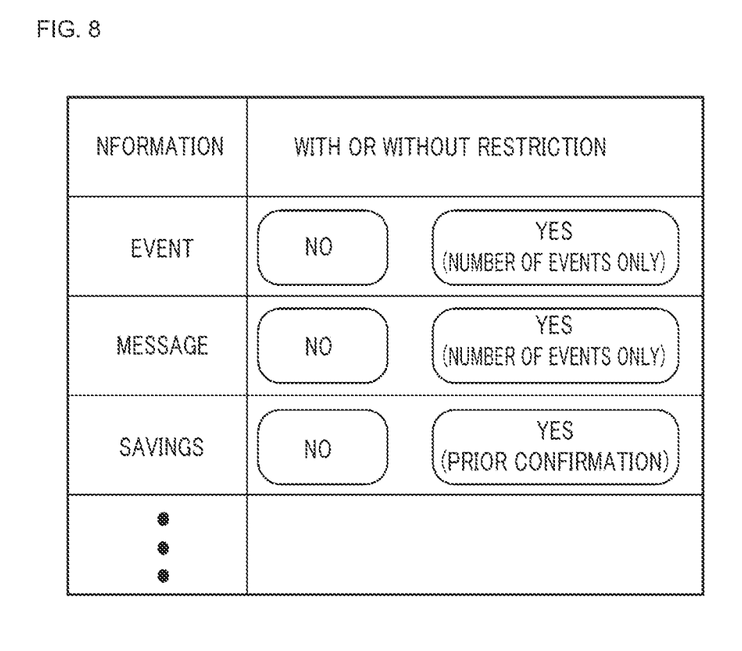
FIG. 8 illustrates an example of a limit presented to the user at the time of setting a peculiar limit.

It is necessary to set this unique restriction for each piece of information in advance according to inputs from the user. For example, as illustrated in FIG. 8, a unique restriction prepared as a template for each piece of information is presented, and the piece of information and the unique restriction are stored in association with each other according to inputs from the user. Further, they may be automatically set by the information processing apparatus 200 on the basis of user's routine, information content, and the like by means of a machine learning algorithm.

Note that since the user has requested the information processing apparatus 200 to provide the information, it may be preferable that the information is even partially provided but while being restricted in the restricted mode, rather than not providing the information at all, that is, performing it in the private mode. Therefore, it is preferable that the private mode is entered when no restriction is set for the requested information.

Further, in voice recognition, a request for information that the user does not intend may be made to the information providing apparatus 100 due to an error in voice recognition processing. In the private mode or the restricted mode, even if such a request for unintended information is made when an unauthorized person is in the space where the information providing apparatus 100 is present, it is possible to prevent the information from being known to a person other than the unauthorized person.

The information providing control by the information processing apparatus 200 is performed as described above.

In a case where the information providing apparatus 100 performs the provision of information in the restricted mode, it is preferable that a notification is issued as an output of the output unit 107 of the information providing apparatus 100 to notify the user of the restricted mode. For example, the information providing apparatus 100 displays a message or an icon indicating that it is in the restricted mode on a monitor serving as the output unit 107. Further, in a case where the information providing apparatus 100 includes an LED serving as the output unit 107, the LED may be turned on or blinked to notify that it is in the restricted mode. Furthermore, when providing the information, the information providing apparatus 100 may output a voice message indicating that the current mode is the restricted mode, such as "Because of restricted mode . . . ", from a speaker serving as the output unit 107. Furthermore, a voice message indicating that the current mode is the restricted mode may be output periodically.

In the above-described embodiment, the description of the processing in which the information processing apparatus 200 automatically switches the mode according to a received communication signal is made. However, the mode may be switched in response to an instruction from the user.

For example, the mode may be switched in response to an input using an operation button serving as the input unit 104 of the information providing apparatus 100 or an input to another device linked with the information providing apparatus 100. Further, a voice recognition function of the information providing apparatus 100 may be used to switch the mode in response to a voice instruction from the user, such as "Enable restricted mode.", "Disable restricted mode.", or "Return to normal mode." Furthermore, when the user gives an instruction with a predetermined keyword, such as "Tell me in detail", for the provision of information in the restricted mode, the mode may be switched accordingly to perform the provision of the information.

In the embodiment, a communication signal is used to determine whether or not the owner of an external device transmitting the communication signal is in the space where the information providing apparatus 100 is present. However, information for identifying individual (personal identification information) may be used in addition to the communication signal. Examples of the personal identification information include face image information captured by a camera and voice information acquired by the microphone 105. Using the personal identification information in addition to the communication signal makes it possible to enhance the accuracy of the mode determination and present the information more appropriately.

In a case where the face image information captured by the camera is used, when a communication signal is registered as a registration signal in the signal registration unit 201, a face image of the owner of an external device transmitting the registration signal is registered so that the communication signal is associated with the registration signal.

Then, in the processing of determining the mode for provision of information, the camera captures an image of the surroundings of the information providing apparatus 100, and the face is detected from the captured image by face detection processing. It is determined whether the detected face is the face associated with the registration signal that is determined to be identical to the communication signal.

On the other hand, in a case where the communication signal is identical to the registration signal, if the detected face and the face associated with the registration signal do not match, the provision of information will be performed in the private mode or the restricted mode. Thus, it is possible to prevent information from being erroneously provided when there is a person the user does not know in the space where the information providing apparatus 100 is present.

Similarly, in a case where voice is used, when a communication signal is registered as a registration signal in the signal registration unit 201, a voice of the owner of an external device transmitting the registration signal is registered so that the communication signal is associated with the registration signal.

Then, in the processing of determining the mode for provision of information, the microphone 105 acquires a voice around the information providing apparatus 100, and the voice of a person is detected by a voice recognition technique. It is determined whether the detected voice is the voice associated with the registration signal that is determined to be identical to the communication signal.

In a case where the communication signal is identical to the registration signal, if the detected voice and the voice associated with the registration signal do not match, the provision of information will be performed in the private mode or the restricted mode. Thus, it is possible to prevent information from being erroneously provided when there is a person the user does not know in the space where the information providing apparatus 100 is present.

In a case where personal identification information such as face or voice is used in this way, a determination on the basis of a communication signal and a determination on the basis of the personal identification information may have different results. In such a case, the determination result on the basis of the personal identification information may be prioritized. This is because the determination on the basis of the personal identification information may have higher reliability than the determination on the basis of the communication signal.

Note that the camera for capturing the face image may be included in the information providing apparatus 100, or an image captured by a camera that is separate from the information providing apparatus 100 may be supplied to the information providing apparatus 100.

In addition to or instead of the face and voice as personal identification information, information such as clothing, figure, and motion may be used.

In the embodiment, the description of setting of a unique restriction for each piece of information is made. However, a unique restriction may be set for each person.

This is performed in a manner that, when a communication signal is registered as a registration signal in the signal registration unit 201, the owner of an external device transmitting the registration signal is registered in association with the registration signal, and further a unique restriction is set for the owner. This makes it possible for the user to optionally disclose all information to his/her parent but not to disclose the information to his/her siblings, for example.

Further, a relationship between the owner of an external device and the user may be registered in association with a registration signal to automatically set a unique restriction. For example, in a case where the relationship of the owner of the external device with respect to the user is a parent, when a communication signal that is identical to a registration signal associated with information of that "parent" is received, the information providing control is performed to provide all information without any restrictions, that is, in the normal mode. Further, in a case where the relationship of the owner of the external device with respect to the user is a friend, when a communication signal that is identical to a registration signal associated with information of that "friend" is received, only the number of pieces of information is provided, only a predetermined piece of information is provided in the normal mode, or any pieces of information of the predetermined piece of information town are not provided, that is, it is performed in the private mode, for example.

Furthermore, an image obtained by the camera may be used to determine a level of information disclosure stepwise on the basis of the position of a person determined to be an unauthorized person from a communication signal of an external device.

When the position of the unauthorized person with respect to the information providing apparatus 100 is acquired by image analysis, the level of information disclosure for the provision of information is set to be reduced, for example, in the order of: when the unauthorized person is in a position where a monitor serving as the output unit 107 of the information providing apparatus 100 is visible, when the unauthorized person is not in a position where the monitor of the information providing apparatus 100 is visible but a voice can reach the information providing apparatus 100, and when the unauthorized person is not in a position where the monitor of the information providing apparatus 100 is visible and a voice cannot reach the information providing apparatus 100.

The position of the unauthorized person may be acquired by position detection based on the volume of the voice obtained by the microphone 105 or the direction of the source of the voice, position detection using a position detection sensor such as an infrared sensor, or a combination of these detection methods to improve the accuracy of position detection.

In the signal registration processing in the signal registration unit 201, in addition to the registration of a communication signal, the name of the external device transmitting the communication signal and/or the name of the owner of the external device may be registered. This makes it possible to present, when a communication signal is received, what and whose device causes the detected communication signal to the user, for example. The name of the external device transmitting the communication signal can be acquired, for example, by referring to information provided by a manufacturer on the Internet from the identification information included in the communication signal. Further, the user may input the name of the external device into the information processing apparatus 200. The name of the owner of the external device needs to be input by the user.

The user may be prompted to register a communication signal on the basis of the time zone in which the communication signal is received. For example, it can be said that there is a high possibility that a communication signal received every night, for example, from 7 p.m. to 11 p.m. is a communication signal transmitted by an external device owned by a family member of the user. In such a case, in addition to presenting information about the communication signal, the output of a message such as "This is likely to be of your family member's terminal. Register?" can prompt the user to register the communication signal.

Further, the user may be prompted to register the communication signal on the basis of the relevance of the appearance timing between a communication signal and an already registered registration signal. For example, if a received new communication signal has the same reception timing as a specific registration signal, there is a high possibility that the new communication signal is a communication signal from a device newly used by the owner of an external device transmitting the specific registration signal. In such a case, in addition to presenting information about the communication signal, the output of a message such as "This is likely to be of your family member's terminal. Register?" can prompt the user to register the communication signal.

2. Modified Examples

Although the embodiment of the present technique is specifically described above, the present technique is not limited to the above-described embodiment, and various modifications based on the technical idea of the present technique are possible.

The information providing apparatus 100 may be any apparatus, such as a desktop personal computer, a laptop computer, a smartphone, and a tablet terminal as well as a standing type smart speaker and a communication robot, as long as it can recognize an information request from a user and provide information to the user.

The space where the information providing apparatus 100 is used is not limited to a house, and may be any space such as a company or a school.

In the embodiment, the processing control unit 203 and the processing execution unit 204 perform the information providing control. However, one processing unit may be responsible for the information providing control of both the processing control unit 203 and the processing execution unit 204.

In the embodiment, the processing control unit 203 performs the information providing control in the normal mode or the private mode, and the processing execution unit 204 performs the information providing control in the restricted mode on the basis of preset unique restriction information. However, for all requests that cannot be handled by the processing execution unit 204 such as an unclear unique restriction, a unique limit with an error, or no restriction in spite of the mode information from the mode determination unit 202 indicating the restricted mode, the processing control unit 203 may control to perform the provision of information in the normal mode or the private mode.

In the embodiment, it is determined, on the basis of a communication signal, whether or not an authorized person and an unauthorized person are in the space where the information providing apparatus 100 is present. However, when no authorized person is in the space where the information providing apparatus 100 is present, the provision of information may not be performed, that is, may be performed in the private mode. For example, when no communication signal that is identical to any of the registration signals is received, it is determined that there is no authorized person in the space where the information providing apparatus 100 is present, and then the provision of information is not performed, that is, may be performed in the private mode.

Further, for example, positional information of an authorized person is acquired by a position detection function such as GPS (Global Positioning System) included in an external device owned by the authorized person. Then, when the information processing apparatus 200 receives the positional information of the authorized person from the external device of the authorized person via the network or the like, and confirms that not all the authorized persons are within the predetermined range around the information providing apparatus 100, then the information processing apparatus 200 enters the private mode.

Further, in a case where the information providing apparatus 100 has a calendar function, when the calendar has a specific character string indicating that another person such as "a visitor" is within a predetermined range around the information providing apparatus 100, that date and time may be controlled in the private mode.

Further, the user may input the date and time for which the user desires the private mode in the calendar, so that the information processing apparatus 200 can control the provision of information to enter the private mode on that date and time.

Further, in a state where a tool to be used for a guest, such as guest slippers and guest tableware, is in use, the information processing apparatus 200 may control the provision of information in the private mode. This can be achieved, for example, by attaching, to the tool to be used for a guest, a detection device for detecting the state of the tool. An example of the detection device is a button-like sensor that is not in a pressed state during storage but in the pressed state during use, and can notify, when it enters the pressed state, the information processing apparatus 200 of that state.

Furthermore, the information processing apparatus 200 may control the information providing apparatus 100 to enter the private mode on the basis of information from another devise, such as a surveillance camera or a security gate, which can detect the entry and exit of a person.

The present technique may also be configured as follows.

(1)

An information processing apparatus wherein, in a mode determination unit, an information-providing method in response to an information-providing request from a user is determined on the basis of a result of comparison of a communication signal or communication signals from one or a plurality of external devices with one or a plurality of registration signals registered in advance.

(2)

The information processing apparatus according to (1), wherein when the communication signal is identical to the registration signal, the mode determination unit sets the information-providing method to a method of providing the information without a restriction.

(3)

The information processing apparatus according to (1) or (2), wherein when the communication signal is not identical to the registration signal, the mode determination unit sets the information-providing method to a method of not providing the information.

(4)

The information processing apparatus according to (3), further including a notification unit that notifies the user that the information is not provided.

(5)

The information processing apparatus according to any one of (1) to (4), wherein when the communication signal is not identical to the registration signal and a restriction is set in advance for provision of information requested by the user, the mode determining unit sets the information-providing method to a method of providing the information with the restriction.

(6)

The information processing apparatus according to (5), wherein the restriction is to provide only the number of pieces of the information.

(7)

The information processing apparatus according to (5), further including a notification unit that notifies the user of a confirmation of whether or not provision of the information is allowed before the provision of the information, the restriction being the confirmation.

(8)

The information processing apparatus according to any one of (1) to (7), wherein the mode determination unit sets the information-providing method to a method of providing the information without a restriction when there is a communication signal that is not identical to the registration signal in the plurality of communication signals and when a reception strength of the communication signal that is not identical to the registration signal is equal to or lower than a predetermined strength.

(9)

The information processing apparatus according to any one of (1) to (8), wherein the mode determination unit sets the information-providing method to a method of not providing the information when there is a communication signal that is not identical to the registration signal in the plurality of communication signals and when a reception strength of the communication signal that is not identical to the registration signal is equal to or higher than a predetermined strength.

(10)

The information processing apparatus according to any one of (1) to (9), wherein the mode determining unit determines whether the communication signal is identical to the registration signal, on the basis of identification information included in the communication signal for identifying the external device that transmits the communication signal.

(11)

The information processing apparatus according to any one of (1) to (10), wherein the mode determination unit determines whether the communication signal is identical to the registration signal, on the basis of whether a difference in reception strength between the communication signal and the registration signal is within a predetermined range.

(12)

The information processing apparatus according to any one of (1) to (11), wherein the mode determination unit further determines a method of providing the information in response to the information providing request from the user on the basis of personal identification information.

(13)

The information processing apparatus according to (12), wherein the personal identification information is either a person's face or a person's voice.

(14)

An information processing method including determining, by a mode determination unit, on the basis of a result of comparing a communication signal or communication signals from one or a plurality of external devices with one or a plurality of registration signals registered in advance, an information-providing method in response to an information providing request from a user.

(15)

An information processing program that causes a computer to execute an information processing method comprising determining, by a mode determination unit, on the basis of a result of comparing a communication signal or communication signals from one or a plurality of external devices with one or a plurality of registration signals registered in advance, an information-providing method in response to an information providing request from a user.

REFERENCE SIGNS LIST

100 Information providing apparatus
200 Information processing apparatus
202 Mode determination unit

The invention claimed is:
1. An information processing apparatus, comprising:
a Central Processing Unit (CPU) configured to:
receive an information providing request from a user;
receive a communication signal from an external device associated with the user;
compare the received communication signal with one or more registration signals registered with the information processing apparatus;
determine a difference in a reception strength between the received communication signal and the one or more registration signals based on a result of the comparison;

determine that the received communication signal is identical to the one or more registration signals based on the difference in the reception strength that is within a range; and determine an information-providing method to provide information to the user, wherein the information-providing method is determined based on the determination that the received communication signal is identical to the one or more registration signals.

2. The information processing apparatus according to claim 1, wherein
based on the received communication signal that is identical to the one or more registration signals, the CPU is further configured to set the information-providing method to a method to provide the information without a restriction.

3. The information processing apparatus according to claim 1, wherein
based on the received communication signal that is unidentical to the one or more registration signals, the CPU is further configured to set the information-providing method to a method of not to provide the information.

4. The information processing apparatus according to claim 3, wherein the CPU is further configured to notify the user that the information is not provided.

5. The information processing apparatus according to claim 1, wherein
based on the received communication signal that is unidentical to the one or more registration signals and a restriction that is set in advance for provision of the information requested by the user, the CPU is further configured to set the information-providing method to a method to provide the information with the restriction.

6. The information processing apparatus according to claim 5, wherein the restriction is to provide only a number of pieces of the information.

7. The information processing apparatus according to claim 5, wherein
the CPU is further configured to notify the user of a confirmation of allowance of the provision of the information,
the user is notified before the provision of the information, and
the restriction set in advance for the provision of the information is the confirmation.

8. The information processing apparatus according to claim 1, wherein the CPU is further configured to set the information-providing method to a method to provide the information without a restriction based on the received communication signal that is unidentical to the one or more registration signals and based on the reception strength of the received communication signal that is unidentical to the one or more registration signals that is equal to or lower than a determined strength.

9. The information processing apparatus according to claim 1, wherein the CPU is further configured to set the information-providing method to a method of not to provide the information based on the received communication signal that is unidentical to the one or more registration signals and based on the reception strength of the received communication signal that is unidentical to the one or more registration signals that is equal to or higher than a determined strength.

10. The information processing apparatus according to claim 1, wherein the CPU is further configured to determine that the received communication signal is identical to the one or more registration signals based on identification information included in the received communication signal to identify the external device that transmits the communication signal.

11. The information processing apparatus according to claim 1, wherein the CPU is further configured to determine a method to provide the information based on personal identification information of the user.

12. The information processing apparatus according to claim 11, wherein the personal identification information is one of a person's face or a person's voice.

13. An information processing method, comprising:
receiving, by a Central Processing Unit (CPU), an information providing request from a user;
receiving, by the CPU, a communication signal from an external device associated with the user;
comparing, by the CPU, the received communication signal with one or more registration signals registered with an information processing apparatus;
determining, by the CPU, a difference in a reception strength between the received communication signal and the one or more registration signals based on a result of the comparison;
determining, by the CPU, that the received communication signal is identical to the one or more registration signals based on the difference in the reception strength that is within a range; and
determining, by the CPU, an information-providing method to provide information to the user, wherein the information-providing method is determined based on the determination that the received communication signal is identical to the one or more registration signals.

14. A non-transitory computer-readable medium having stored thereon computer-executable instructions, that when executed by a processor, cause the processor to execute operations, the operations comprising:
receiving an information providing request from a user;
receiving a communication signal from an external device associated with the user;
comparing the received communication signal with one or more registration signals registered with an information processing apparatus;
determining a difference in a reception strength between the received communication signal and the one or more registration signals based on a result of the comparison;
determining that the received communication signal is identical to the one or more registration signals based on the difference in the reception strength that is within a range; and
determining an information-providing method to provide information to the user, wherein the information-providing method is determined based on the determination that the received communication signal is identical to the one or more registration signals.

15. An information processing apparatus, comprising:
a Central Processing Unit (CPU) configured to:
receive an information providing request from a user;
receive a communication signal from an external device associated with the user;
compare the received communication signal with one or more registration signals registered with the information processing apparatus;
determine that the received communication signal is identical or unidentical to the one or more registration signals based on a result of the comparison; and determine an information-providing method to provide information to the user, wherein the information-providing method is determined based on the determination that the received communication signal is identical or unidentical to the one or more registration signals, wherein based on the received communication signal that is unidentical to the one or more registration signals and a restriction that is set in advance for provision of the information requested by the user, the CPU is further configured to:
   set the information-providing method to a method to provide the information with the restriction; and
   notify the user of a confirmation of allowance of the provision of the information, wherein
  the user is notified before the provision of the information, and
  the restriction set in advance for the provision of the information is the confirmation.

\* \* \* \* \*